US008990960B2

(12) United States Patent
Jussila

(10) Patent No.: US 8,990,960 B2
(45) Date of Patent: Mar. 24, 2015

(54) METHOD FOR NEAR FIELD COMMUNICATION OPERATION, A DEVICE AND A SYSTEM THERETO

(71) Applicant: TeliaSonera AB, Stockholm (SE)

(72) Inventor: Olli Jussila, Jarvenpaa (FI)

(73) Assignee: Teliasonera AB, Stockholm (SE)

( * ) Notice: Subject to any disclaimer, the term of this patent is extended or adjusted under 35 U.S.C. 154(b) by 49 days.

(21) Appl. No.: 13/757,941

(22) Filed: Feb. 4, 2013

(65) Prior Publication Data
US 2013/0205414 A1 Aug. 8, 2013

(30) Foreign Application Priority Data

Feb. 3, 2012 (EP) .................................. 12153814

(51) Int. Cl.
| | |
|---|---|
| G06F 17/30 | (2006.01) |
| G06F 7/04 | (2006.01) |
| H04N 7/16 | (2011.01) |
| H04L 29/06 | (2006.01) |
| G06Q 20/32 | (2012.01) |

(Continued)

(52) U.S. Cl.
CPC ............ *H04L 63/04* (2013.01); *G06Q 20/3278* (2013.01); *H04L 63/0853* (2013.01); *H04W 12/06* (2013.01); *G06Q 20/409* (2013.01); *H04W 4/008* (2013.01); *H04W 88/02* (2013.01); *H04L 2463/102* (2013.01); *H04L 63/0428* (2013.01)
USPC ................. 726/30; 726/27; 713/300; 380/201

(58) Field of Classification Search
CPC .............. G06F 21/10; G11B 20/00086; H04L 63/0428; H04L 2463/101; H04L 63/12
USPC .......... 713/168–174, 182–186, 202; 709/225, 709/229; 726/2–8, 21–30
See application file for complete search history.

(56) References Cited

U.S. PATENT DOCUMENTS

| | | | |
|---|---|---|---|
| 2009/0065571 A1 | 3/2009 | Jain | |
| 2011/0277015 A1* | 11/2011 | Murakami | ................. 726/3 |

(Continued)

FOREIGN PATENT DOCUMENTS

| | | |
|---|---|---|
| WO | 2007/068993 | 6/2007 |
| WO | 2009/156880 | 12/2009 |

OTHER PUBLICATIONS

European Search Report dated Jul. 27, 2012, in corresponding application EP 12 15 3814.

(Continued)

*Primary Examiner* — Evans Desrosiers
(74) *Attorney, Agent, or Firm* — Young & Thompson

(57) ABSTRACT

A method, a user terminal and a system for performing a NFC operation by a NFC equipped user terminal. According to a method a common application residing in a secure element of the user terminal can be authenticated by receiving, in the common application, an authentication request message including identification information on at least service provider of the NFC reader. Based on the identification information authentication related data on a service provider of NFC service is retrieved from a database. Furthermore, a data request message is received from the NFC reader. The data is retrieved, on the basis of identification information on at least service provider of the NFC reader and identification information for data, from the database residing in the secure element of the user terminal. The data requested is delivered to the NFC reader.

8 Claims, 4 Drawing Sheets

(51) Int. Cl.
*H04W 12/06* (2009.01)
*G06Q 20/40* (2012.01)
*G06F 1/00* (2006.01)
*H04W 4/00* (2009.01)
*H04W 88/02* (2009.01)

(56) References Cited

U.S. PATENT DOCUMENTS

2011/0312270 A1 12/2011 White

2013/0080778 A1* 3/2013 Chaudhry ................ 713/168

OTHER PUBLICATIONS

GSMA: "mobile NFC technical guidelines—Version 2.0", Internet Citation, Nov. 2007, pp. 1-95, XP002495767, Retrieved from the Internet : URL:http://www.gsmworld.comidocumentsinfc/gsma__nfc2__wp.pdf [retrieved on Sep. 9, 2008].

* cited by examiner

| SP ID | Authentication / Crypto method | Authentication / Crypto Key | User Interface Data |
|---|---|---|---|
| SP X | DES | xxx | SP Name / URL / Phonenum/... |
| SP Y | DES | yyy | SP Name / URL / Phonenum/... |
| ... | ... | ... | ... |

| SP ID | DATA | DATA ID | User Interface Data |
|---|---|---|---|
| SP X | 10111 | Cust ID | Name / number / expiration date |
| SP Y | 11100 | Event 234 | Name / description / expiration date |
| ... | ... | ... | ... |

METHOD FOR NEAR FIELD COMMUNICATION OPERATION, A DEVICE AND A SYSTEM THERETO

TECHNICAL FIELD

The invention concerns in general the technical field of NFC communication. Especially the invention concerns arrangement of common application in the secure element in order to enable NFC operation with multiple service providers.

BACKGROUND OF THE INVENTION

NFC is an acronym for Near Field Communication. NFC enables a communication between two objects, for instance between a mobile terminal and a base station that has been equipped with an integrated or an ad hoc antenna. NFC's specificity is that the communication is established over a distance of a few centimeters, or even with the two objects touching. This is the main difference with other wireless technologies such as Bluetooth and Wi-Fi that allow communication over a much larger distance.

Generally speaking NFC system comprises a terminal device or a tag, a base station, which many times is so called NFC reader for reading (and also writing is some cases) information from the terminal capable to NFC communication and/or NFC tag, and lot of back-end systems in order to provide information to be delivered, but also managing and controlling the data to be transferred as well as establishing secure paths for utilizing the NFC technique. It should also be mentioned that NFC communication is not limited to a pair of two devices, but merely the devices can talk with multiple other devices over NFC technology.

The application areas of NFC technology are diversified. NFC technology as such would serve in a very good way such areas in which contactless operation increases the speed of service, for example. Such areas of application are contactless tokens, ticketing and payments as well as pairing different devices for one reason or another.

As can already be seen from the application areas of the NFC technology one of the most important aspects is to arrange security for each of the steps in NFC system. The general risks in NFC, as in other wireless communication also, are eavesdropping, data corruption, data modification, data insertion and man-in-the-middle-attack, for example.

FIG. 1 illustrates a simplified diagram of an NFC system. Firstly, there are one or more service providers $100_1$-$100_N$, who are offering a NFC service. Some examples of the service providers $100_1$-$100_N$ can be shops, transport authorities and cinemas. The service providers arrange so called back-end functionalities for NFC services, such as charging, validity, content related issues for example. Additionally, the service providers offer necessary applications for both user terminals 110 of end-users and/or points-of-sales 120 having the NFC readers 121 in place. According to some embodiment the NFC system also comprises so called trusted service manager (TSM) 130 between the service providers $100_{1-N}$ and the user terminals 110 of the end-users. The role of TSM 130 is important due to the fact that usually service providers want to offer the NFC service independently on the telecom operator needed for establishing several communication channels between the parties of the NFC system. The TSM 130 interconnects the telecom operators and service providers. Additionally, the TSM 130 guarantees security and confidentiality between service provides and network operators among other tasks. Moreover, TSM 130 enables that each party in the NFC system can concentrate to essential issues from their perspective. For example, the service providers have one-stop shop for establishing the NFC service if they have the service itself in place when using TSMs' 130 services. There is no need to spend time and money for e.g. security related issues since TSM 130 takes care of those. Naturally, if a service provider $100_1$-$100_N$ is willing to arrange everything mentioned above among other necessary tasks in order to establish a NFC service, one can do that without any cooperation with a TSM 130. Even if FIG. 1 illustrates only one TSM 130, there are typically multiple TSMs 130 operating parallel in the markets.

However, the above described system causes challenges especially from end-user's point of view. In order to use NFC services from different service operators the user needs to download a corresponding application $112_{1-N}$ into the user terminal. Thus, it means that an end-user may have dozens of applications $112_1$-$112_N$ from different service providers only for NFC purposes. Additionally, such a situation needs also some configuration of a SIM (Subscriber Identity Module) card (or UICC; Universal Integrated Circuit Card) managed by the telecom operator since at least some parts of the application and/or data need to be stored to a secure element such as SIM card in order to arrange secure environment for NFC service. Typically, the space in a secure element is allocated to service providers by creating supplementary security domain according to Global Platform standards. Such parts of the service and/or data is referred with $114_1$-$114_N$ in FIG. 1. Naturally, the utilization of the secure element owned by the telecom operator requires arrangements of contractual issues between the telecom operator and the service provider(s) $100_1$-$100_N$ and/or TSM 130.

When the user wants to use NFC service when e.g. being in a point-of-sale, the user needs to select an application $112_1$-$112_N$ in order to activate the NFC service in the user terminal and additionally the user needs to find the data (e.g. a ticket or coupon) to be used by means of the application. After those actions the user is ready to take his or her user terminal to the vicinity of the NFC reader in order to accomplish the NFC service. The activation of the service in the NFC reader 121 may initialize some data exchange between the systems and devices in the point-of-sale 120 and the backend systems of service providers $100_1$-$100_N$.

Furthermore, the arrangement of secure communication channels between the parties of the NFC system is also a topic due to the application areas of NFC technology. Firstly, the service providers $100_1$-$100_N$ and TSM 130 needs to communicate in a secure way in order to enabling the creation of user-specific data by the service providers $100_1$-$100_N$ and transfer of it the user terminal of the end-user through TSM 130. The service providers $100_1$-$100_N$ and TSM 130 arrange the communication by establishing a heavily secured communication channel 140 based on encryption keys for each of the service providers $100_1$-$100_N$, which are exchanged e.g. manually so that the established communication channel really is secure. The communication channel 150 from TSM 130 to a user terminal 110 of the end user is secured by the telecom operator as the wireless transmission comprises its own encryption algorithms, which can be trusted. Typically, so called Global Platform Secure Channel Protocols like SCP02 and SCP80 are used.

Additionally, the service providers $100_1$-$100_N$ need to communicate with devices and systems in the point-of-sale 120 in order to deliver the necessary data to and from the NFC readers 121 residing in the point-of-sale 120. For that purpose a secure communication channel 160 can also be established. For example, so call Hypertext Transfer Protocol Secure (HT- TPS) can be utilized. Lastly, the communication channel 170 between the NFC reader 121 and the user terminal 110 is secured with some encryption method which can be arranged by TSM 130 by creating and delivering necessary encryption keys to both the NFC reader 121 and to the user terminal 110 to be used in the mutual communication. Another aspect is that there are several encryption keys involved in NFC ecosystem. Key exchange ceremonies/procedures between ecosystem players like. SP, TSM, MNO are taken care of with well-known and trusted technologies and processes.

As can be seen from the above the NFC system requires lot of arrangement in order to bringing the NFC service into the market. Moreover and especially, the described system from end-user point of view is heavy and the NFC service is challenging to use. Additionally, the current system does not speed up the use of the service in the point-of-sale, which, in turn, may reduce end-users' willingness to adopt the NFC technology as a whole. If there are several service provider specific applications, which in practice are doing very similar tasks, it increases the work load and costs relating to testing, certification and life cycle management of these applications, for instance.

SUMMARY OF THE INVENTION

An objective of the invention is to present a method, a NFC equipped user terminal and a system for mitigating the challenges in the adaptation of NFC technology. Another objective of the invention is that the method, the user terminal and the system introduce a novel approach to accomplish a NFC operation in such a manner that the management of the NFC operation related data and the use of the data during the NFC operation can be simplified.

The objectives of the invention are achieved by arranging a common application and a database in a secure element of a user terminal. The common application and the database are configured to be utilized by different service providers of NFC services. Furthermore, by arranging a communication between the secure element of the user terminal and an external party, such as a NFC reader, in such a manner that the external party may call data stored in the database through the common application, the objects of the invention can be reached.

Some aspects of the invention relate to a method for performing a NFC (Near Field Communication) operation by a NFC equipped user terminal communicating with a NFC reader. The method comprises a step of inquiring data from database by receiving a data request message, in a common application residing in a secure element of the NFC equipped user terminal, from the NFC reader, the data request message comprising identification information on at least a service provider of the NFC reader and identification information for data to be retrieved from a database residing in the secure element of the NFC equipped user terminal, and delivering a response message comprising data requested, data being retrieved by the common application from the database on a basis of the identification information on the service provider of the NFC reader and identification information for data to be retrieved from the database residing in the secure element of the user terminal. The inquiry of data can be initiated in response to an authentication of the common application residing in the secure element of the NFC equipped user terminal, the authentication comprising steps of receiving, in the common application residing in the secure element of the user terminal, an authentication request message comprising identification information on the service provider of the NFC reader, and delivering a response message to the authentication request message, the response message being at least partly modified by means of the authentication information retrieved by the common application, on the basis of the identification information on the service provider of the NFC reader, from the database residing in the secure element of the user terminal. Furthermore, according to some aspects of the invention the inquiry of the data or the authentication of the user terminal is initiated from a receipt of a request, from the NFC reader, for activation a common application residing in a secure element of the user terminal in response to detecting the NFC equipped user terminal in the vicinity of the NFC reader, the vicinity being below of an activation distance of the NFC operation. The response message to the authentication request message may be at least party modified by means of at least one of the following: an encryption method, at least one encryption key. Additionally, the method may further comprise a step of encrypting the data request message from the NFC reader and the delivered response message by means of the encryption method and the encryption key.

Some further aspects of the invention relate to a NFC (Near Field Communication) equipped user terminal for performing a NFC (Near Field Communication) operation, whre the NFC equipped user terminal comprises a secure element. Furthermore, the secure element comprises at least a common application to communicate with multiple NFC readers of multiple service providers, the common application is configured to deliver instructions in response to the communication with a NFC reader in order to control a database in the secure element. The database is configured to store information on at least some of the multiple service providers, the information being retrievable by the common application on a basis of identification information of the service provider of the NFC reader. The user terminal is configured to interact with the secure element in response to a communication from the NFC reader. The NFC equipped user terminal may be configured to encrypt the communication with the NFC reader by means of the information stored in the database. Further, according to some aspects of the invention the secure element is one of the following: UICC card, SIM card.

Still some further aspects of the invention relate to a system for performing a NFC operation. The system may comprise one or more NFC readers of multiple service providers, a NFC equipped user terminal, which comprises at least a common application to communicate with one or more NFC readers of the service providers, the common application is configured to deliver instructions in response to a communication with a NFC reader in order to control a database in the secure element, and the database is configured to store information on at least some of the multiple service providers, the information being retrievable by the common application. Furthermore, in the system an identification information on the service provider of the NFC reader is configured to be delivered to the common application by the NFC reader in order to retrieve the service provider specific information from the database. According to some aspects of the invention the NFC reader of a service provider residing in the system is configured to initiate communication with the NFC equipped user terminal in response to detecting the NFC equipped user terminal in the vicinity of the NFC reader, the vicinity being below of an activation distance of the NFC operation.

A method according to the invention is characterized by the steps recited in the characterizing part of the independent claim directed to a method.

A NFC equipped user terminal according to the invention is characterized by the features recited in the characterizing part of the independent claim directed to a NFC equipped user terminal.

A system according to the invention is characterized by the features recited in the characterizing part of the independent claim directed to a system.

Some advantageous embodiments of the invention are disclosed in the dependent claims.

The exemplary embodiments of the invention presented in this patent application are not to be interpreted to pose limitations to the applicability of the appended claims. The verb "to comprise" is used in this patent application as an open limitation that does not exclude the existence of also un-recited features. The features recited in depending claims are mutually freely combinable unless otherwise explicitly stated.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE INVENTION AND ITS ADVANTAGEOUS EMBODIMENTS

Figure 1:
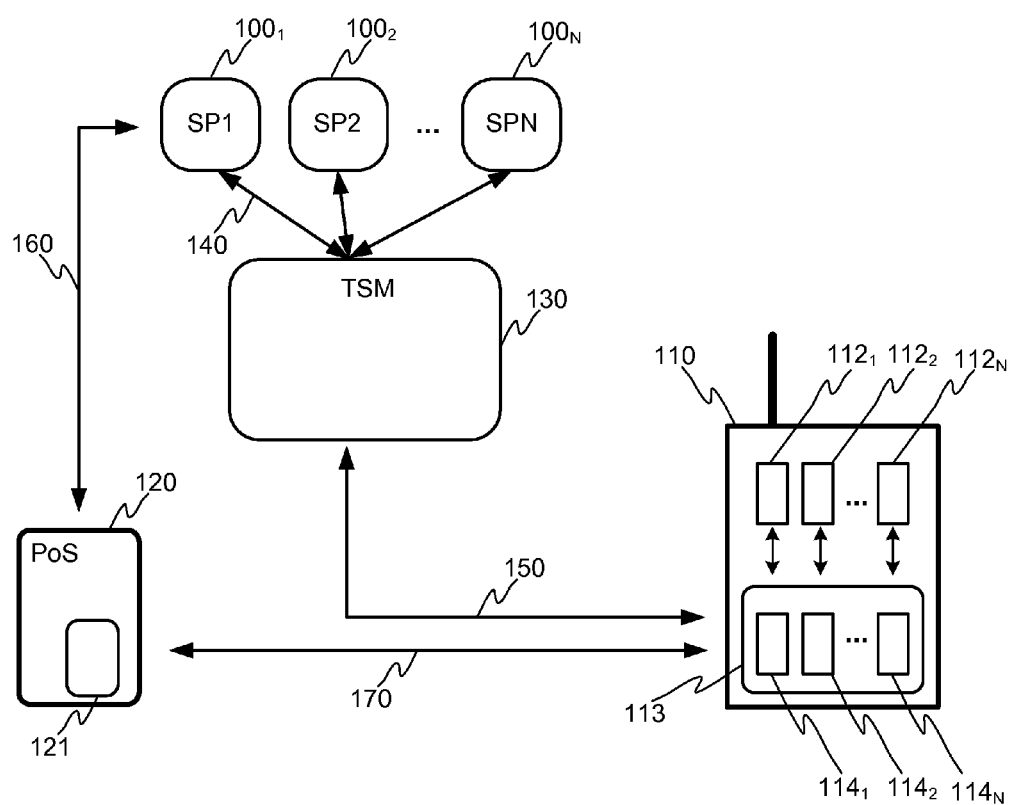
FIG. 1 illustrates a simplified diagram of an NFC system.
Figures 2, 3A, 3B:
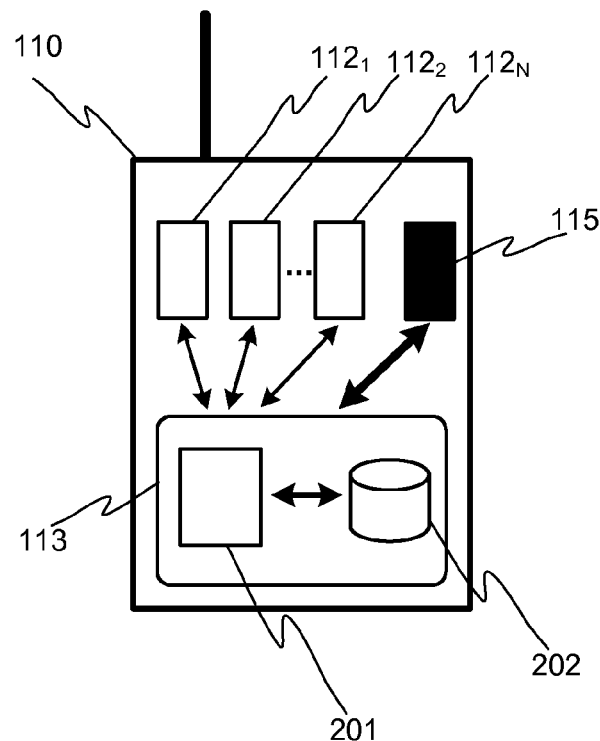
FIG. 2 illustrates a user terminal according to an embodiment of the invention.
FIGS. 3a and 3b illustrates some examples of a data structure according to the invention.

FIG. 2 illustrates a user terminal in which a novel data structure is established in the secure element 113 of the user terminal 110, such as SIM (or UICC), according to an embodiment of the invention. The user of the user terminal may have downloaded and installed applications $112_1$-$112_N$ of the service providers $100_1$-$100_N$ into the memory of the user terminal 110, which executes the applications $112_1$-$112_N$ by means of the user terminal 110, such as at least one processor and one or more memory elements for storing the portions of computer program code for the applications $112_1$-$112_N$. The SIM card 113 is an indispensable element in any user terminal 110 utilizing a mobile communication network. The SIM card 113 according to the invention is modified in such a manner that it may provide common secure related services to the applications $112_1$-$112_N$ of the service providers $100_1$-$100_N$. Additionally, the SIM card 113, as a secure element for NFC operations, according to the invention may provide detection of any communication from NFC reader side requesting authentication and/or data residing in the SIM card 113 according to the invention and may be configured to respond to such a request with the necessary information and data. The SIM card 113 is provided with a common application 201, which is configured to replace all service provider $100_1$-$100_N$ specific applications in the SIM card 113. The common application 201 can be created by the telecom operator, or any supplier for them, and it provides the common authentication related operations in order to communicate with other entities, such as service provider specific applications $112_1$-$112_N$, NFC readers 121 and/or TSM 130 in a secure manner. Additionally, the common application 201 comprises procedures in order to store, check and retrieve data from a database 202 implemented in the SIM card 113 according to the invention. The database is a common element for the service providers $112_1$-$112_N$ for storing, checking and retrieving data in order to implement secure communication channel between the different entities as well as accomplish any NFC service related operations. Furthermore, the user terminal may comprise, according to some embodiment of the invention, a public application 203 external to the secure element, which public application is configured to co-operate and communicate with the common application residing and executed in the secure element. Alternatively, the public application 203 may function as a type of proxy element for the common application 201. The public application 203 may be part of the common application 201, but performing the operations defined in portions of computer program code when executed by a processing unit in a public area of the user terminal so that it can directly communicate with any external device, for example. According to an embodiment of the invention the portions of computer program code of the public application 203 is stored to a memory of the user terminal 110, the portions of the computer program code are configured to be executed by a processing unit of the user terminal 110. Additionally, an interface between the public application 203 and the common application 201 is implemented enabling a communication between the applications with each other. The public application 203 is especially needed in so called peer-to-peer applications with any external device, such as another user terminal 110 since 'unknown' external devices cannot directly access to the secure element residing in the user terminal 110, as is the case with the NFC reader 121 of a service provider for example.

Generally speaking both the secure element and especially the common application 201 and the public application 203, when communicating with any external element, such as an NFC reader 121 or another user terminal 110 may utilize the hardware and computer program components of the user terminal 110 in question. Typically, for NFC purposes a so called NFC controller is implemented to execute operations between e.g. the secure element of the user terminal comprising NFC related functions and the hardware and computer programs of the user terminal 110. As a result an NFC equipped user terminal is available for NFC related operations, as is the case with the current invention.

FIGS. 3a and 3b illustrate an example of the data structures for different contexts implemented in the database 202 of the SIM card according to the invention. The data structure according to the example illustrated in FIG. 3a discloses a common table into which security related data can be stored from one or more service providers $100_1$-$100_N$. The data structure according to this embodiment comprises a service provider ID in order to distinguish different service providers $100_1$-$100_N$ in the table and to retrieve correct data from the data structure when requested. The data structure also comprises authentication and encryption related information such as which crypto method is to be used with a specific service provider $100_1$-$100_N$ as well as an encryption key if any. In this example, both of the service providers $100_1$-$100_N$ SP X and SP Y use so called Data Encryption Standard (DES) method for encryption which is based on a symmetric key algorithm. The data structure comprises the symmetric key in order to utilize the DES method when needed. It is clear that the security method can be any other than the DES, such as another symmetric key based method like Advanced Encryption Standard (AES) or the security method can be based on a utilization of asymmetric-key cryptography if applicable, for example. The data structure further more comprises additional data, such as user interface data in this example. This is such data, which shall be used and/or utilized in the user interface if needed. For example, the data disclosed in the column may be shown for the user when such a NFC service is used. In this example the user interface data consists of the name of the service provider, Universal Resource Locator (URL) and Phone number, but it can also be anything else. As already said, the data structure for security related data is configured to be utilized by every service provider in order to get rid of separate applications with necessary data in the SIM card 113 thus minimizing the memory usage in the SIM card 113 and in the user terminal 110. The SIM card 113 can contain as many entries as necessary with the limitation of the memory capacity in the SIM card 113. Additionally, further advantage is achieved by improving the overall computing performance of terminal with lower amount of dedicated service provider applications. According to some further embodiment of the invention the data can be encrypted by the SIM card 113 with the encryption algorithms used in the SIM card 113 and stored to the memory of the user terminal 110 if needed. According to the invention the data structure is known by the service providers $100_1$-$100_N$ and/or TSM 130 in order to enable the preparation of the necessary data by the service providers $100_1$-$100_N$ and/or TSM 130. The data stored in the data structure according to FIG. 3a is primarily configured to be utilized in authentication and encryption of the data channel and/or data between the parties, such as the user terminal 110 and NFC reader 121 for example.

The data structure shown as an example in FIG. 3b is, in turn, configured to store data relating to the NFC operation itself. More precisely, the data structure is again built up as a service provider $100_1$-$100_N$ basis (SP ID). Furthermore, the data structure comprises the data itself to be used in NFC operation (in column 'Data'). For example, the data for the first service provider SP X comprises the data itself, which is classified as expressing the Customer ID (i.e. Loyalty ID). Additionally, some extra information is stored to the data structure, such as Name of the user, loyalty ID number as well as expiration date for the loyalty program. Similarly, for the service provider SP Y the data structure contains data '11100', which is classified as a ticket for an 'Event 234'. The User Interface Data comprises some additional data to be shown to the user when the ticket is used by means of communication with NFC reader 121. Again, the data structure shown in FIG. 3b is an example of the necessary data to be stored in order to implement NFC services. The number of data entries may be the same as the number of data entries disclosed in FIG. 3a or different. According to some embodiment of the invention the data structure shown in FIG. 3a comprises common data to be used in each of the data entries in data structure 3b for a certain service provider $100_1$-$100_N$. In other words, a service provider $100_1$-$100_N$ may have several entries in the data structure according to FIG. 3b i.e. multiple valid tickets to a cinema. However, when the user uses the tickets, the same data entry from the data structure of FIG. 3a is retrieved in order to establish a secure channel with the NFC reader in the point-of-sale 120.

Figure 4A:
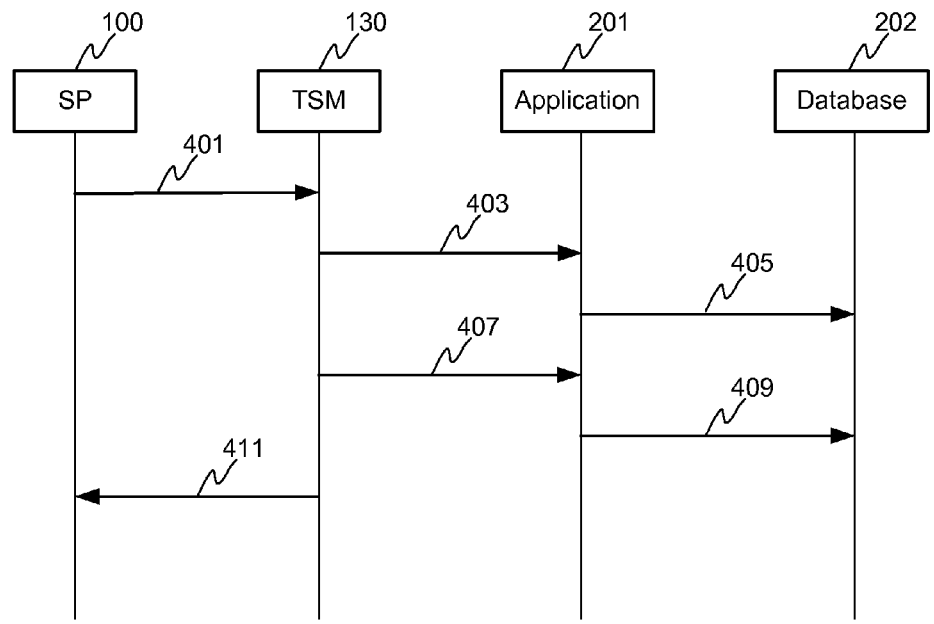
FIGS. 4a and 4b illustrate an example to deliver data to the data structures.

Next, it is discussed, by referring to FIG. 4a, about some aspects of the invention for delivering the data as described in context of FIGS. 3a and 3b into the data structures. In order to establish a new data entry into the database of the secure element residing in the user terminal 110, when e.g. a user has ordered a NFC service from a service provider $100_1$-$100_N$, the service provider $100_1$-$100_N$, by means of computing unit with necessary communication means, delivers an initiation message 401 to TSM 130 with information on the user (e.g. Mobile Station International Subscriber Directory Number; MSISDN) and an identification code of the service provider $100_1$-$100_N$. The TSM 130 forwards the initiation message 403 of the data entry, with necessary modifications if any, to the common application 201 residing in the SIM card 113 of the user terminal 110 with the information on at least the service provide $100_1$-$100_N$ requesting the creation of the data entry. The common application 201 is configured to analyze the initiation message and interpret the instructions in the message. As a result, the common application 201 is configured to order the establishment of a new database entry for the service provider $100_1$-$100_N$ in question with a database entry creation message 405. The message contains at least the identification information (ID) on the service provider $100_1$-$100_N$ requesting the entry. Alternatively or in addition, the common application is configured to inquire from the database, if there already exists an entry for the service provider $100_1$-$100_N$ with the ID delivered. The same can already be done by the TSM when checking the data of the previous requests delivered from the service provider $100_1$-$100_N$. Furthermore, TSM 130 is configured to, in response to the receipt of the initiation message 401 from the service provider $100_1$-$100_N$, extract and/or create security related data according to the contracts between the service provider $100_1$-$100_N$ in question and TSM 130. According to an embodiment of the invention at least a key for encryption purposes is created as well as method for encryption is decided. The mentioned information is delivered to the common application 201 in message 407. The common application instructs the database 202 to store at least the encryption key and the method for encryption to the database 202. According to some embodiment of the invention the TSM 130 finally acknowledges 411 the service provider $100_1$-$100_N$ on the accomplished task. The acknowledgement message 411 can be delivered in response to when either of messages 403 or 407 is delivered, or alternatively the common application 201 may give an acknowledgement message to TSM 130 (not illustrated in FIG. 4a), which triggers the delivery of the message 411. Alternatively or in addition, the service provider $100_1$-$100_N$ may receive a message informing that it was not possible to create and deliver the requested information to the database. In response to this, the service provider $100_1$-$100_N$ may e.g. delete all information created for the user and/or re-create the information and/or requesting from the user necessary information, such as correct MSISDN number, in order to establish the data entry to the database 202.

Figure 4B:
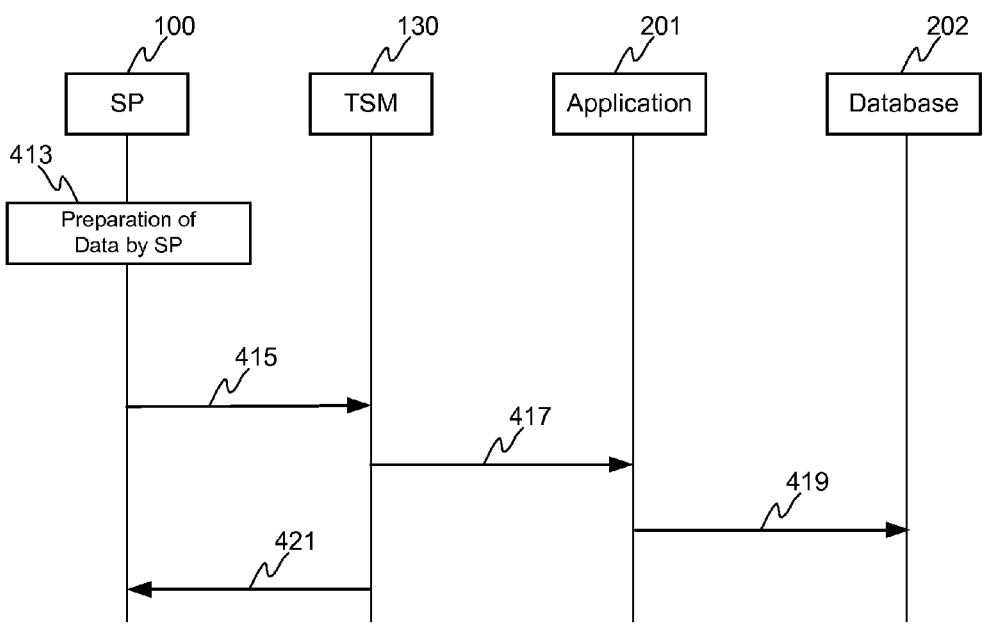

As a new data entry is established to the database 202 it is necessary to deliver data to be used in NFC operation, such as in ticketing, to the database 202. FIG. 4b illustrates this. The service provider $100_1$-$100_N$ prepares data 413 to be delivered to the database 202. The preparation of data 413 can be initiated from the request to the service provider $100_1$-$100_N$ delivered by the user to initiate the creation of a data entry as depicted in FIG. 4a. Alternatively, the preparation of data 413 can be initiated after receiving the acknowledgment message 411 from the TSM 130 that the creation of the data entry in the database 202 is accomplished, for example. In response to the accomplishment of the preparation of the data 413 the prepared data is delivered 415 from the service provider $100_1$-$100_N$ to the TSM 130. The TSM may just forward the data according to its procedures or store or modify at least part of the data if needed. Moreover, the TSM is configured to establish a communication channel to the user terminal 110 and to the common application 201 and to deliver 417 the prepared data over-the-air (OTA) channel to the common application 201. The common application 201 is configured to check the received data and instruct to store the data 419, with necessary modifications if any, to the database 202 under the data entry for the service provider $100_1$-$100_N$ in question.

As can be concluded from the above, the message delivered originally from the service provider $100_1$-$100_N$ contains an identification of the service provider $100_1$-$100_N$ in question, which information is carried to at least the common application 201 so that the common application 201 can store the prepared data under a correct service provider $100_1$-$100_N$ entry in the database 202. Again, the TSM 130 is configured to deliver an acknowledgement message to the service provider $100_1$-$100_N$. The acknowledgement message 421 can be delivered in response to when message 417 is delivered, or alternatively the common application 201 may give an acknowledgement message to TSM 130 (not illustrated in FIG. 4b), which triggers the delivery of the message 421. Again, the service provider $100_1$-$100_N$ may receive a notification message that the procedure, as shown in FIG. 4b, could not be accomplished and necessary measures are configured to be initiated in such a case.

Figure 5:
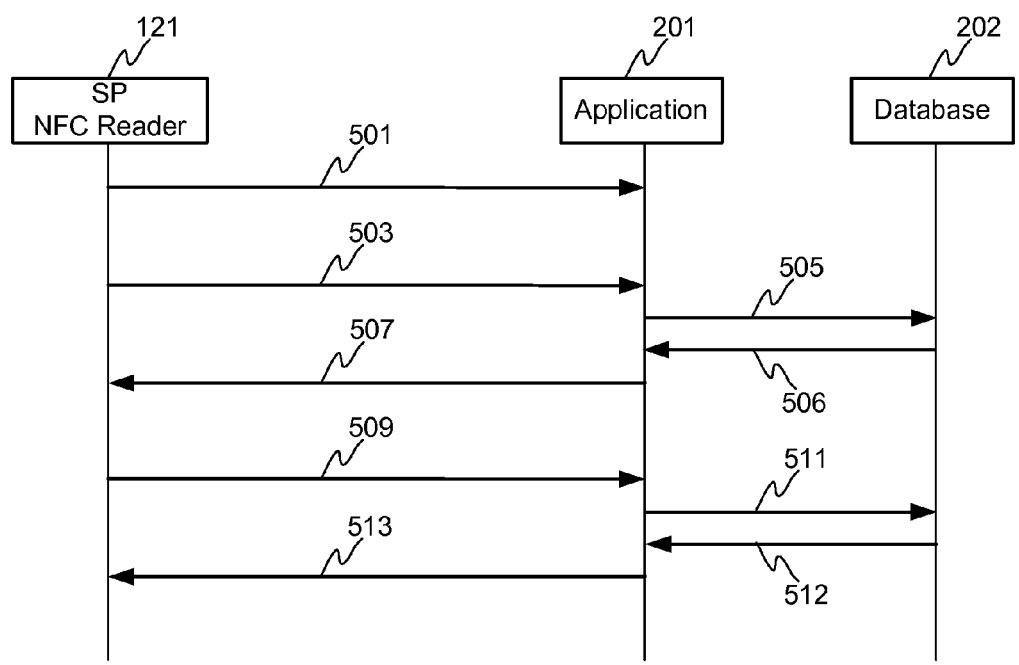
FIG. 5 illustrates a embodiment of the method according to the invention.

FIG. 5 illustrates the use case of the invention according to an embodiment of the invention. The illustration covers a situation that a user is using the NFC service related data stored in the database 202 in a point-of-sale 120. The user takes his/her user terminal to the vicinity of the NFC reader 121 in order to initiate the procedure. The NFC reader 121, as a master device, is configured to deliver an initiation message 501 to request the common application 201 residing in the secure element i.e. SIM card 113 in this case in order to initiate NFC operation. In the next step, the NFC reader 121 is configured to initiate a mutual authentication 503 by delivering authentication request 503 comprising identification information on at least the service provider $100_1$-$100_N$ (SP ID) of the NFC reader 121 in the point-of-sale. Alternatively or in addition, the initiation message, in which the common application 201 is called, may comprise the identification information of the service provider $100_1$-$100_N$ of the NFC reader 121. The common application 201, once received the identification information of the service provider $100_1$-$100_N$, is configured to retrieve, on the basis of the identification information on the service provider $100_1$-$100_N$, the requested authentication information from the database 202. The data i.e. the authentication information to be retrieved from the database 202 comprises at least the keys to be used for authentication and/or encryption in the communication between the NFC reader 121 and the common application 201 residing in the secure element of the user terminal 110. The requested data is retrieved 506 from the database 202. The secure element is configured, by means of the common application, to prepare a response message to the authentication request message. The response message is at least partly modified by means of the authentication information retrieved by the common application, on the basis of the identification information on the service provider of the NFC reader, from the database residing in the secure element of the user terminal. According to an embodiment of the invention the response message is thus encrypted according to the encryption method as stored in the database. The encryption may utilize the encryption key from a database, if such is found from there. In step 507, the common application delivers the response message 507 to the NFC reader in order to accomplish the authentication and/or encryption related tasks. The NFC reader is configured to recognize that the response message is modified according to pre-agreed method for the service provider in question and the authentication can be accepted. According to some embodiment of the invention a pre-agreed content is modified by means of the authentication data stored in the database and the NFC reader is configured to decrypt the content and compare it to a corresponding data stored in the NFC reader. If they match, the NFC operation can be continued. On a contrary, if no authentication information is found or the authentication method used does not match with the service provider in question, the NFC reader can abort the NFC operation. As a summary, the applications i.e. the common application and the application in the reader are configured to authenticate each other by utilizing the identification information of the service provider in question according to at least some embodiment of the invention. The method steps for authentication may vary according to the authentication method in use. Some methods may only comprise unidirectional communication (e.g. there is a need that the NFC reader recognizes the common application 201 but not vice versa).

In the next step, according to the aspect of the invention, the NFC reader 121 is configured to deliver a message 509 requesting data stored in the database 202. The message 509 comprises at least an ID for the service provider $100_1$-$100_N$. According to some embodiment of the invention the message 509 also comprises a data ID to be retrieved from the database 202 by means of instructions from the common application 201. This is especially important if the data structure comprises multiple data entries for a service provider $100_1$-$100_N$. The message 509 may be encrypted if the encryption is applied in the communication. In response to receipt of the request message 509 the common application 201 is configured to retrieve the data 511, on the basis of the ID of the service provider $100_1$-$100_N$ and/or data ID, from the database 202. The requested data is retrieved 512 from the database 202. Finally, the common application 201 is configured to deliver the retrieved data from the database 202 to the NFC reader 121 with a data message 513. The data message 513, again, is either encrypted or non-encrypted depending if encryption is applied in the communication.

For clarity reasons the FIG. 5 does not illustrate an acknowledgement message to the initiation message 501 for calling the common application 201 residing in the secure element. However, it is clear that an acknowledgement message can be given by e.g. the common application 201 that it is ready to take any further requests from the NFC reader 121. Additionally, some embodiments of the invention may comprise, in response to the message 513, that the NFC reader 121 still delivers some information to the common application and/or to the database. For example, according to some embodiments it is necessary to update the data in the database to close the NFC operation (e.g. to mark the ticket invalid when used).

In some use cases it may happen that a user initiates an NFC operation without any knowledge if he or she can use the NFC in a point-of-sale. This can happen e.g. in a shop, when the cashier asks for a loyalty card. In a method according to the invention no data can be found from the database 202. According to some embodiment of the invention it can be arranged that if no data specific to the service provider is found, the database can return some basic information on the user in order to initiate a creation of a data record, such as a loyalty card. The basic information of the user can be delivered to the NFC reader, which in turn is configured to call the back-end system of the service provider for creating a data record for the user. The service provider delivers, according to pre-agreed practices the data to the TSM, which in turn creates and delivers such a data record (e.g. a loyalty card) to the database of the secure element according to practices shown in FIGS. 4a and 4b. Thus, the user of the NFC system may get value-adding service.

According to some embodiment of the invention the common application 201 is configured, by means of computer implemented methods, to detect the validity information of a data entry in the database 202. If it is detected that some data is not valid anymore, the common application can be configured to delete the invalid information e.g. periodically from the database. According to some embodiment of the invention the common application may request acceptance for the deletion from the user by e.g. showing a warning message on the screen of the user device 110 and requesting acceptance by means of I/O means of the user terminal 110.

As said the database 202 may contain some additional data i.e. user interface data. For example, if a user is going to movies and using his/her pre-stored ticket information through NFC system as described in context of FIG. 5, the common application may initiated some procedures according to instructions stored in the User Interface Data of the data entry. For example, in response to the use of the ticket, the common application may download on its own, or triggered by the NFC reader 121, additional information from an URL stored in the User Interface Data. It can be e.g. some background information relating to the movie so that the user can receive additional information more or less automatically before the movie starts. Similar implementations can be developed on the basis of the service in question.

In the description it is generally discussed the functionality of the secure element residing in the user terminal 110. The common application is configured to perform procedural steps as described. The common application 201 comprises portions of computer program stored in a memory element of the secure element, which are executed in a processing unit, such as in one or more processors, implemented in the secure element i.e. a SIM card 113 in this case. Both the common application and the database are preferably implemented in a so called closed area of the secure element. In other words, only some trusted parties, such as a telecom operator, have access to the closed area in order to implement there all and/or any of the elements and procedures relating to the invention described herein. However, in order to implement the communication with any external party to the secure element, such as TSM 130 and/or NFC reader 121, it is possible to utilize typical elements of a user terminal, such as a mobile phone. Such elements are antennas and modems, for example. Naturally, the internal communication between the secure element and the hardware and/or software executed by the hardware of the user terminal 110 may require new interfaces and/or modifications to existing interfaces between the mentioned elements.

Even if it is generally referred to service providers $100_1$-$100_N$ and TSM 130 in the description herein, it means the technical elements and units under supervision of the mentioned parties. Such technical elements and units may comprise computers and servers configured to communicate with each other and with any external entities by means of wired and wireless modems implemented and/or coupled to the technical elements and units.

The secure element as referred in the description may primarily be a SIM (or UICC) card 113 as described. However, it is possible that the secure element is implemented to the user device without any external smart card by e.g. as a software module comprising portions of computer program, which when executed by a processing unit, may perform similar functions and operations as a smart card as a secure element. The characteristics of the secure element are that it is only accessible only by some pre-agreed parties, such as a telecom operator, in order to establish the required security level for NFC operations.

The NFC operation referred here can be any functionality between the NFC reader and a NFC equipped user terminal. The NFC operation comprises communication between the mentioned parties as described in this context. The NFC operation, in general, may relate to a wide range of application areas, as discussed in the background part of the description.

Some advantageous embodiments according to the invention were described above. The invention is not limited to the embodiments described. The inventive idea can be applied in numerous ways within the scope defined by the claims attached hereto.

What is claimed is:

1. A method for performing a Near Field Communication (NFC) operation by an NFC-equipped user terminal communicating with an NFC reader, the method comprising:
   obtaining data from a database by
      receiving a data request message, in a common application residing in a secure element of the NFC-equipped user terminal, from the NFC reader, the data request message comprising identification information of at least a service provider of the NFC reader and identification information for data to be retrieved from the database residing in the secure element of the NFC-equipped user terminal, the secure element being implemented on an integrated circuit card provided by a telecom operator, and
      delivering a response message comprising the requested data, the data being retrieved by the common application from the database based on the identification information of the service provider of the NFC reader and the identification information for data to be retrieved from the database residing in the secure element of the user terminal; and
   encrypting the data request message from the NFC reader and the delivered response message by an encryption method and at least one encryption key,
   wherein the NFC reader of the service provider is configured to initiate communication with the NFC-equipped user terminal in response to detecting the NFC-equipped user terminal in the vicinity of the NFC reader, the vicinity being below an activation distance of the NFC operation.

2. The method as claimed in claim 1, wherein the inquirying of data is initiated in response to an authentication of the common application residing in the secure element of the NFC-equipped user terminal, the authentication comprising:
   receiving, in the common application residing in the secure element of the user terminal, an authentication request message comprising identification information of the service provider of the NFC reader, and
   delivering a response message to the authentication request message, the response message being at least partly modified by the authentication information retrieved by the common application, based on the identification information of the service provider of the NFC reader, from the database residing in the secure element of the user terminal.

3. The method as claimed in claim 2, wherein the response message to the authentication request message is at least partly modified by at least one of the following: the encryption method and the at least one encryption key.

4. The method as claimed in claim 1, wherein the inquirying of the data or the authentication of the user terminal is initiated from a receipt of a request, from the NFC reader, for activation of the common application residing in the secure element of the user terminal in response to detecting the NFC-equipped user terminal in the vicinity of the NFC reader, the vicinity being below the activation distance of the NFC operation.

5. A Near Field Communication (NFC)-equipped user terminal for performing a operation, the NFC-equipped user terminal comprising:
   a secure element implemented on an integrated circuit card provided by a telecom operator, the secure element comprising
      a common application to communicate with multiple NFC readers of multiple service providers, the common application being configured to deliver instructions in response to communication with one of the NFC readers in order to control a database in the secure element, and
      the database for storing information of at least some of the multiple service providers, the information being retrievable by the common application based on identification information of the service provider of the NFC reader,
   wherein the user terminal is configured to interact with the secure element in response to a communication from the NFC reader, the communication from the NFC reader and a communication response message including data retrieved by the common application from the database being encrypted by an encryption method and at least one encryption key,
   wherein the NFC reader of the service provider is configured to initiate communication with the NFC-equipped user terminal in response to detecting the NFC-equipped user terminal in the vicinity of the NFC reader, the vicinity being below an activation distance of the NFC operation.

6. The NFC-equipped user terminal as claimed in claim 5, wherein the NFC-equipped user terminal is configured to encrypt the communication with the NFC reader by the information stored in the database.

7. The NFC-equipped user terminal according to claim 5, wherein the secure element is implemented on one of the following: a Universal Integrated Circuit Card (UICC) card and a Subscriber Identity Module (SIM) card.

8. A system for performing a Near Field Communication (NFC) operation, the system comprising:
   one or more NFC readers of multiple service providers; and
   an NFC-equipped user terminal including
      a common application to communicate with one or more NFC readers of the service providers, the common application being configured to deliver instructions in response to a communication from one of the NFC readers in order to control a database in a secure element of the NFC-equipped user terminal, the secure element being implemented on an integrated circuit card provided by a telecom operator, and
      the database storing information of least some of the multiple service providers, the information being retrievable by the common application,
   wherein the system is configured such that identification information of the service provider of the NFC reader is delivered to the common application by the NFC reader in order to retrieve the service provider specific information from the database,
   the communication from the NFC reader and a communication response message including data retrieved by the common application from the database being encrypted by an encryption method and at least one encryption key, and
   the NFC reader of the service provider is configured to initiate communication with the NFC-equipped user terminal in response to detecting the NFC-equipped user terminal in the vicinity of the NFC reader, the vicinity being below an activation distance of the NFC operation.

* * * * *